United States Patent [19]
Aronson

[11] 3,942,645
[45] Mar. 9, 1976

[54] FEEDING AND RECTIFYING APPARATUS AND METHOD

[75] Inventor: Theodore F. Aronson, Glen Cove, N.Y.

[73] Assignee: Eli Lilly and Company, Indianapolis, Ind.

[22] Filed: June 26, 1969

[21] Appl. No.: 836,872

[52] U.S. Cl. ............... 209/104; 198/271; 198/287; 221/157
[51] Int. Cl.² .................. B07B 13/02; B65G 47/24
[58] Field of Search..... 198/33 R, 33 AD, 271, 287; 209/74, 94, 95, 87, 96, 104; 221/157, 156, 152

[56] References Cited
UNITED STATES PATENTS

| | | | |
|---|---|---|---|
| 2,857,039 | 10/1958 | Whitecar | 221/156 X |
| 2,915,165 | 12/1959 | Bell | 198/33 R |
| 3,372,790 | 3/1968 | Pembroke et al. | 198/33 R |
| 3,489,262 | 1/1970 | Roberts | 198/33 R |
| 3,508,647 | 4/1970 | Meier et al. | 209/74 |
| 3,613,861 | 10/1971 | Whitecar | 198/271 |

Primary Examiner—Allen N. Knowles
Assistant Examiner—Hadd S. Lane
Attorney, Agent, or Firm—Ralph W. Ernsberger; Everet F. Smith

[57] ABSTRACT

This disclosure is directed to a feeding and rectifying method and apparatus for orienting articles of manufacture in a predetermined manner onto a moving conveyor means. The feeding and rectifying apparatus comprises essentially a system of maintaining a supply of articles in a hopper through which the articles are randomly discharged. The dispensing of the articles from the hopper is attained by effecting relative rotation between the discharge means and the hopper, and orientation or rectification of the articles thus removed is effected by cooperating camming means and gauging means mounted for relative rotation with respect to one another operating on the article.

2 Claims, 30 Drawing Figures

INVENTOR.
THEODORE F. ARONSON

INVENTOR.
THEODORE F. ARONSON
BY
*Irving Seidman*
ATTORNEY

INVENTOR.
THEODORE F. ARONSON
BY
Irving Seidman
ATTORNEY

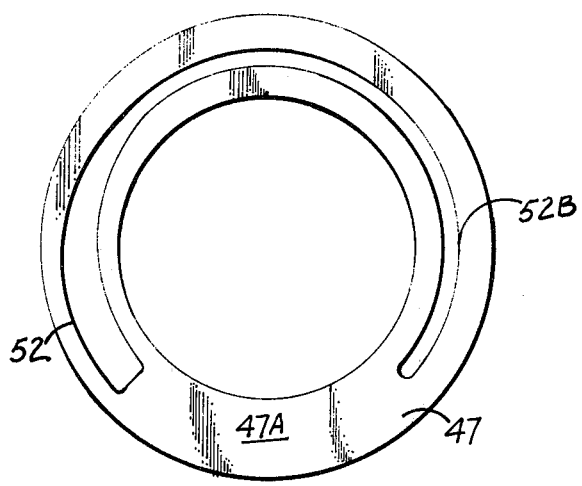
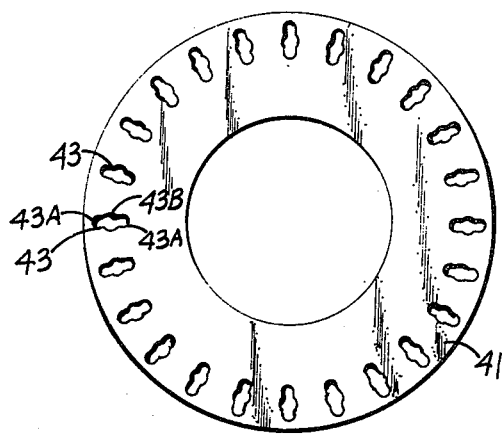
FIG. 4
FIG. 6A
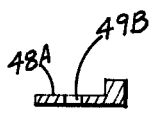
FIG. 5A
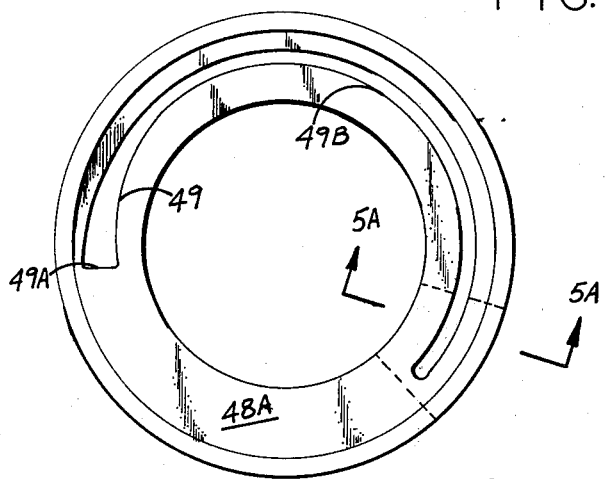
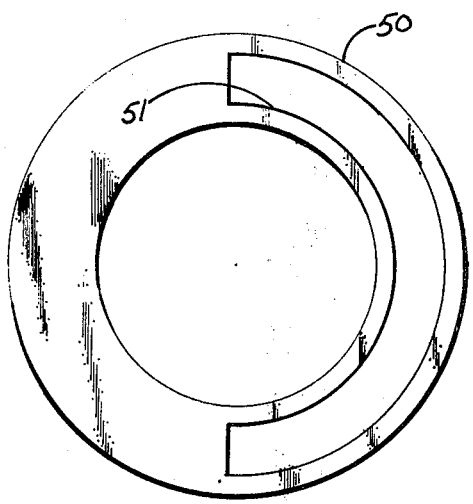
FIG. 5
FIG. 6
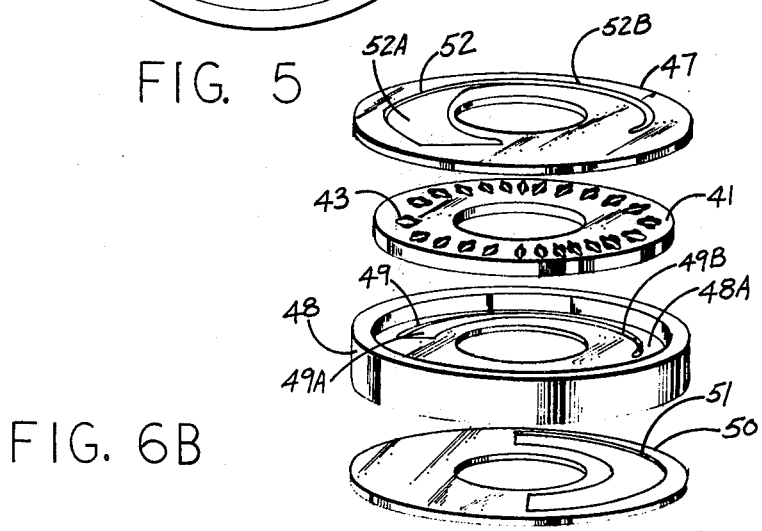
FIG. 6B
INVENTOR.
THEODORE F. ARONSON
BY
ATTORNEY

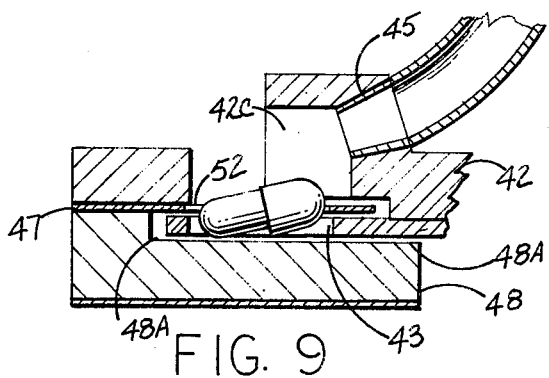
FIG. 9
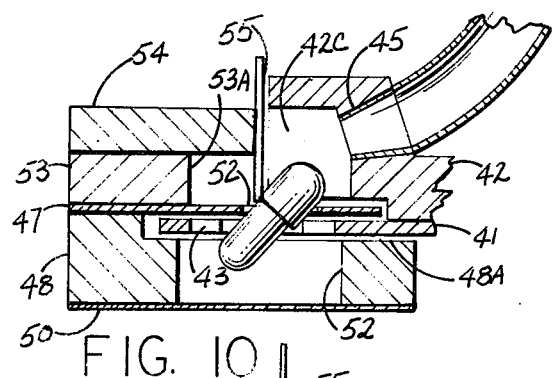
FIG. 10
FIG. 9A
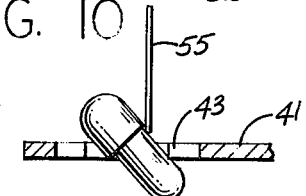
FIG. 10A
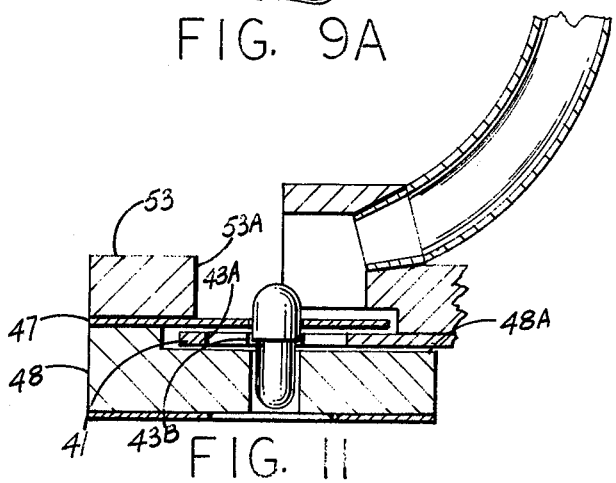
FIG. 11
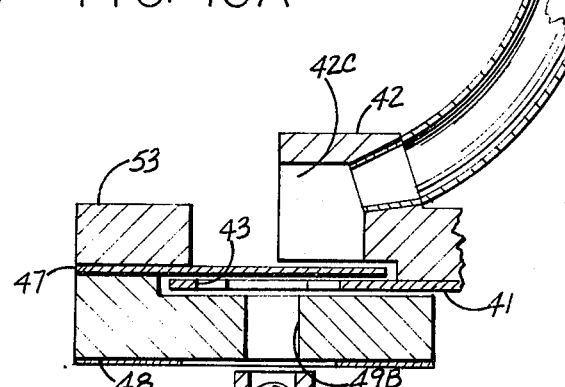
FIG. 12
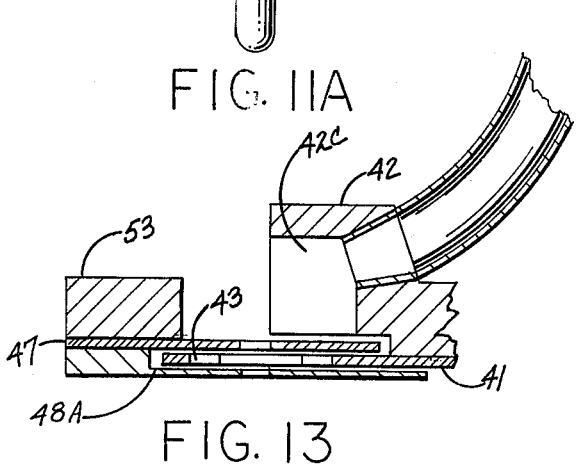
FIG. 11A
FIG. 13
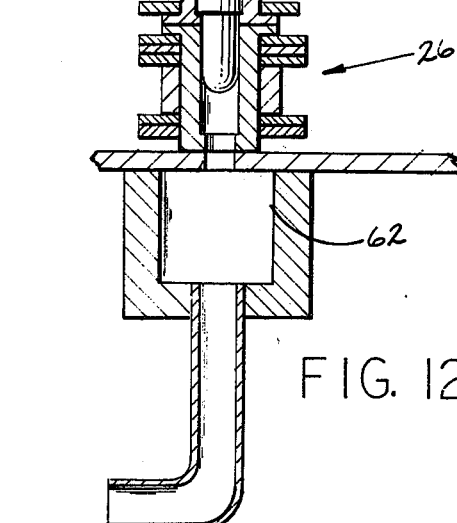
INVENTOR.
THEODORE F. ARONSON
BY
ATTORNEY

INVENTOR.
THEODORE F. ARONSON
BY
ATTORNEY

FEEDING AND RECTIFYING APPARATUS AND METHOD

PROBLEM IN THE ART

In the manufacturing arts, many manufacturing and-/or product handling operations require that a given article be predeterminedly orientated so that each article will be properly presented so that the next succeeding operation may be properly performed thereon. For example in the capsule filling art, it is imperative that the capsule be properly presented to a filling station. Generally such capsules comprise a body portion and a cap portion frictionally interfitted to define a closed volume. In effecting the filling of such capsules the cap and body portion must be first separated to expose the open end of the body for receiving its contents. For this reason it is imperative that the capsules be properly orientated.

Heretofore considerable effort has been expended to effect a method and apparatus for effecting the rectification of various products. However, the known methods and apparatus for effecting such orientation or rectification of products were relatively complicated and relatively difficult and expensive to manufacture. Furthermore the known devices were particularly constructed to rectify a particular product or article and therefore and principle of operation of such methods and apparatus were not universally suited for other or differently shaped products.

OBJECTS

It is therefore an object of this invention to provide an improved method and apparatus which can be readily adapted to feed and rectify variously shaped articles or objects onto a moving conveyor which is relatively simple in operation and relatively inexpensive to fabricate.

Another object is to provide an apparatus for feeding and rectifying articles of manufacture having a minimum of moving components.

Another object is to provide a method and apparatus for feeding and rectifying articles of manufacture in which only the properly sized articles are rectified.

Another object is to provide a method and apparatus for feeding and rectifying articles of manufacture in which the articles are rectified by effecting the gauging of the article between relative rotating camming and gauging means under the influence of a centrifugal force.

Another object is to provide an apparatus for rectifying articles of manufacture which can be readily and quickly adapted with a minimum of effort to accommodate variously shaped articles by an interchange of gauging plates.

BRIEF SUMMARY OF INVENTION

The foregoing objects and other features and advantages of this invention are attained by a method of maintaining a random supply of articles in a hopper and effecting the discharge of the articles from the hopper in an orderly sequence by relative rotation between the hopper and the discharge therefor. The articles thus removed are then subjected to a centrifugal force in which an axis of the articles is initially disposed in the plane in which the centrifugal force is acting. While under the influence of the centrifugal force the axis of the article is rotated to a position substantially normal to the plane of the centrifugal force by subjecting the article to a camming action so as to predeterminedly position or orientate the article.

The apparatus by which the method may be performed comprises a hopper for receiving a random supply of articles. The hopper is provided with a discharge arranged for relative rotation with respect to the hopper. Associated with the discharge is a gauging means which is turn in cooperatively associated with a stator or camming means and means are provided for effecting relative rotation between the gauge means and the stator or camming means. Complementary means are formed on the stator or camming means and the gauging means for effecting rectification of the article during relative rotation therebetween. The complementary means of the gauge means includes a gauging plate having a series of slots each having opposed gauging portions sized substantially to the shape of the article with an enlarged escapement portion disposed therebetween. The complementary portion of the stator or camming means includes a cam plate having a camming opening formed with an edge for guiding the rectifying article toward the escapement portion of the gauge slot during relative rotation of the gauge plate and stator or camming means. The arrangement is such that whichever way an article is presented to the complementary portion of the gauge plate and stator, the article is gauged so as to insure proper orientation of the article. Means are also provided to insure positive initiation of the rectifying movement of the article relative to the gauge slot, and means are also provided for effecting a control release of the article from the discharge means.

FEATURES

A feature of the invention resides in the provision of a method and apparatus in which a plurality of articles can be rapidly and positively gauged and oriented.

Another feature of the invention resides in the provision of rectifying articles of manufacture by subjecting the article to the action of a relative rotating pair of complementary gauging and camming means.

Another feature of the invention resides in the provision in which the action of the complementary rotating gauging and camming means can be utilized to orientate variously shaped articles.

Other features and advantages will become more readily apparent when considered in view of the drawings in which:

FIG. 4 is a detail plan view of the upper cam member of the orientation portion of the apparatus.

FIG. 5 is a detail plan view of a complementary lower cam member of the orientation portion of the apparatus.

FIG. 5A is a section taken along line 5A—5A on FIG. 5.

FIG. 6 is a detail plan view of the floor plate of the orientation portion of the apparatus.

FIG. 6A is a detailed plan view of the gauging plate.

FIG. 6B is an exploded perspective of the camming and gauging means.

FIG. 9 is an enlarged detailed sectional view taken along line 9—9 or position 3 on FIG. 3.

FIG. 9A illustrates an alternate position which the article may assume in FIG. 9—9.

Figures 3, 7, 7A, 8, 8A:
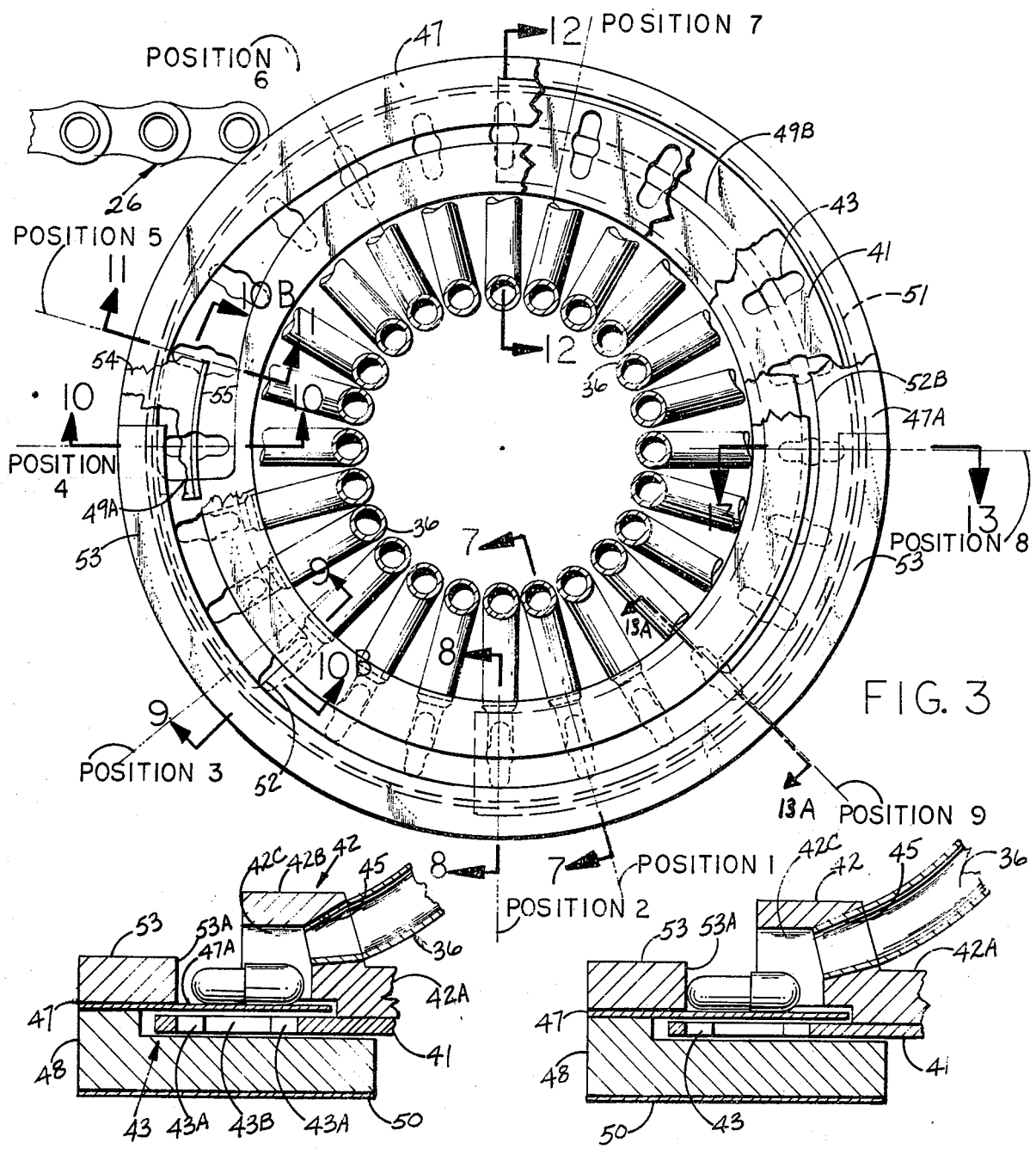
FIG. 3 is a plan view taken along line 3—3 on FIG. 1.
FIG. 7 is an enlarged detail view taken along line 7—7 or position 1 on FIG. 3.
FIG. 7A illustrates an alternate position which an article may assume in the showing of FIG. 7.
FIG. 8 is a sectional view taken along line 8—8 or position 2 on FIG. 3.
FIG. 8A is an alternate position which the article may assume in FIG. 8.

FIG. 10 is a sectional view taken along line 10—10 in the vicinity between positions 4 and 5 on FIG. 3.

FIG. 10A is an alternate position which the article may assume in the illustration of FIG. 10.

Figure 10B:
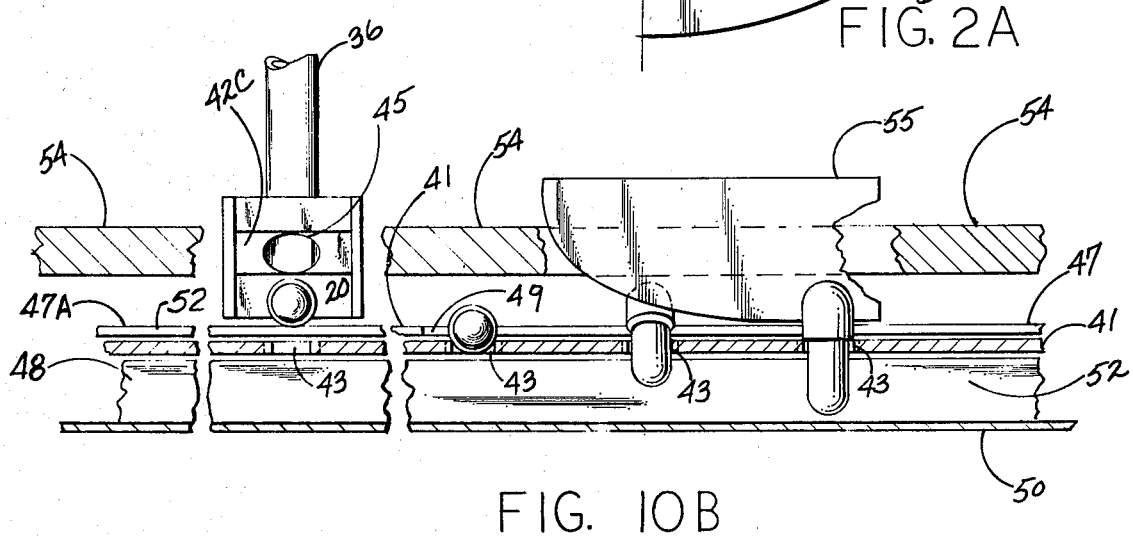

FIG. 10B is a sectional view taken along line 10B—10B on FIG. 3.

FIG. 11 illustrates the relative position of the article taken along line 11—11 between positions 5 and 6 in FIG. 3.

FIG. 11A illustrates an alternate position which the article may assume in the position of FIG. 11.

FIG. 12 is a sectional view taken along line 12—12 or at position 7 in FIG. 3 illustrating the discharge of the rectified article and the positioning of the same on a moving conveyor.

FIG. 13 is a section view taken along line 13—13 on FIG. 3.

Figure 13A:
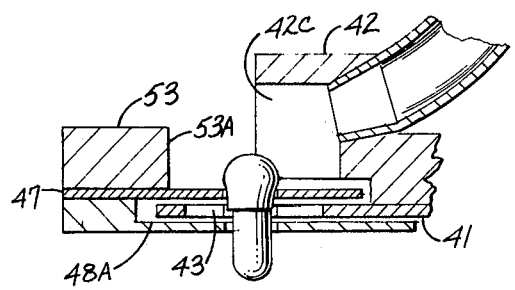

FIG. 13A is a sectional view taken along line 13A—13A or position 9 to illustrate a purged portion of the cycle of revolution.

Figure 14:
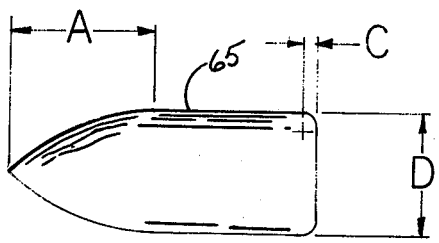

FIG. 14 is a modified article shape which may be rectified by the described method and apparatus.

Figure 14A:
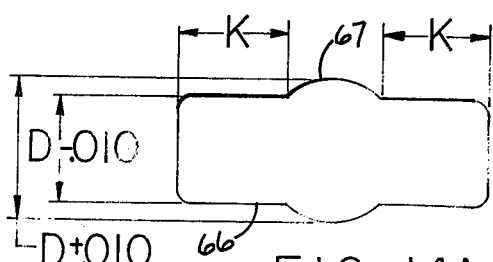

FIG. 14A is a plan view of a modified gauge slot construction for effecting rectification of articles shaped as shown in FIG. 14.

Figure 15:
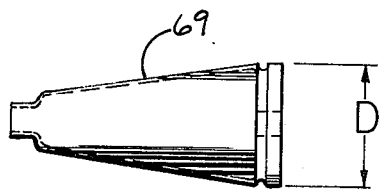

FIG. 15 illustrates another modified shape which may be rectified by the described method.

Figure 15A:
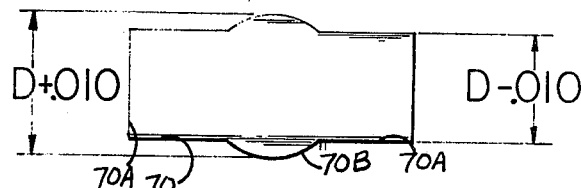

FIG. 15A illustrates a plan view of a gauge slot for effecting rectification of the article shape of FIG. 15.

Figure 16:
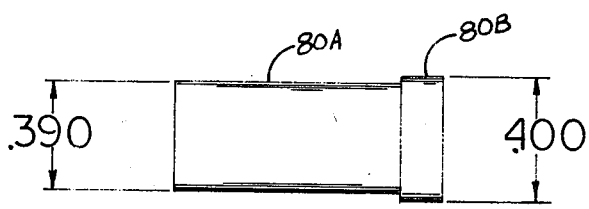
Figure 16A:
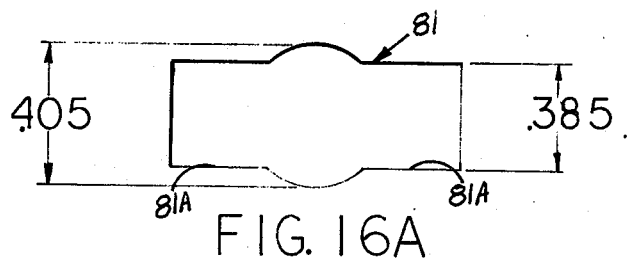

FIG. 16 and 16A illustrate a modified object and gauge slot therefor, respectively.

In many manufacturing arts and/or product handling operations wherein an article is being handled, it is frequently necessary that the article be orientated in a particular manner so that it can be properly presented in a predetermined manner to the next succeeding operating station. The present invention is directed to a method and an apparatus for performing the method for rectifying or orienting articles having an elongated shape and a non-uniform cross-sectional area. While the method and apparatus to be described can be used to effectively rectify variously shaped articles, the article primarily referred to for the purpose of illustrating and describing the invention is a capsule. Generally such capsules 20, as shown, comprise a body portion 21 and a cap portion 22 which are arranged to be frictionally interfitted together to define a closed volume. Such capsules 20 may be formed of various materials adapted to received various products. In the pharmaceutical arts such capsules are formed of a readily digestible gelatin material and are filled with various medical powders or ingredients. In other commercial applications, such capsules may be formed of other materials, i.e., plastic, glass, metal, etc., and may be filled with various articles of manufacture wherein the capsule forms the package for such articles. However, regardless of the material or substance to be placed in the capsule, it is imperative that the capsule be oriented so that the respective portions thereof can be properly presented to a suitable filling station.

The capsule thus comprises an elongated member having a longitudinal axis and varying cross sectional dimensions as defined by the outside diameter of the body portion 21 which is slightly less than the outside diameter of the cup 22. Thus as used herein the term capsule may include any solid or hollow article having a longitudinal axis and varying cross-sectional dimensions equal to or less than the length of the longitudinal axis.

To effect rectification of such articles, the present invention contemplates maintaining a random supply of such articles 20 in a hopper means 23 from which the articles may be withdrawn in an orderly manner whereby the successively removed articles are disposed in alignment or randomly stacked in end to end relationship. The orderly array of articles withdrawn from the hopper is attained by effecting relative rotation between the hopper discharge means 24 and the hopper body 23A.

The articles or capsules 20 thus removed are maintained in alignment, i.e. in end to end relationship from whence the bottom or end most article is sequentially released at a predetermined point in the cycle of operation. The released article 20 is then subjected to a centrifugal force whereby the article is predeterminedly positioned with respect to relative rotating camming means and gauging means which cooperate to effect rectification of the article regardless of which way the article has been released from the hopper 23. While under the influence of the centrifugal force the longitudinal axis of the article is rotated about a point intermediate the longitudinal axis relative to the gauging means. This rotation may effected by gravity and/or by subjecting the capsule to a camming action imparted by a centered camming means.

Rotating of the axis of the capsule about a point intermediate the length of the axis is attained by causing the smaller end of the capsule to drop through an appropriately sized gauging opening formed in the gauging means. The direction of rotation of the capsule so as to effect proper rectification is controlled by a gauging opening which is sized for accommodating the smaller cross-sectional dimension of the article. This is attained by a gauging opening formed in the gauging means having similarly sized opposed gauging opening portions which are substantially sized to the smaller cross-sectional dimension of the article whereby the smaller cross-sectional portion of the article can be passed therethrough. Intermediate the opposed gauging portions, the gauge opening is provided with an enlarged escapement portion for permitting the article to pass completely therethrough only when the article has been properly rectified.

In operation, centrifugal force to which the article 20 is subjected, upon its release from the hopper 23 and associated discharge, causes the article 20 to be positioned over the gauge opening which is rotated in unison with the article. Because the article 20 is provided with varying cross-sectional dimensions, the smaller end of the article will tend to pass through the corresponding gauging portion of the gauge opening causing the larger end to follow. The tendency of the smaller end to first pass through the gauging portion of the opening causes the article 20 to rotate to a rectified position regardless of which way the article is presented to the gauging opening. As the article tends to fall through a gauging portion of the opening, a camming action is imparted to the article for directing it toward the escapement portion of the gauge opening. When the article has been shifted due to the camming influence operating thereon, to the escapement portion of the gauging opening, the enlarged portion of the article is then permitted to pass therethrough. A moving conveyor means, synchronized to the movement of the gauging and camming action is provided so that as each article is properly rectified it is received in a conveyor whereby the rectified article can be suitably transported to the next succeeding operating station.

Figure 1:
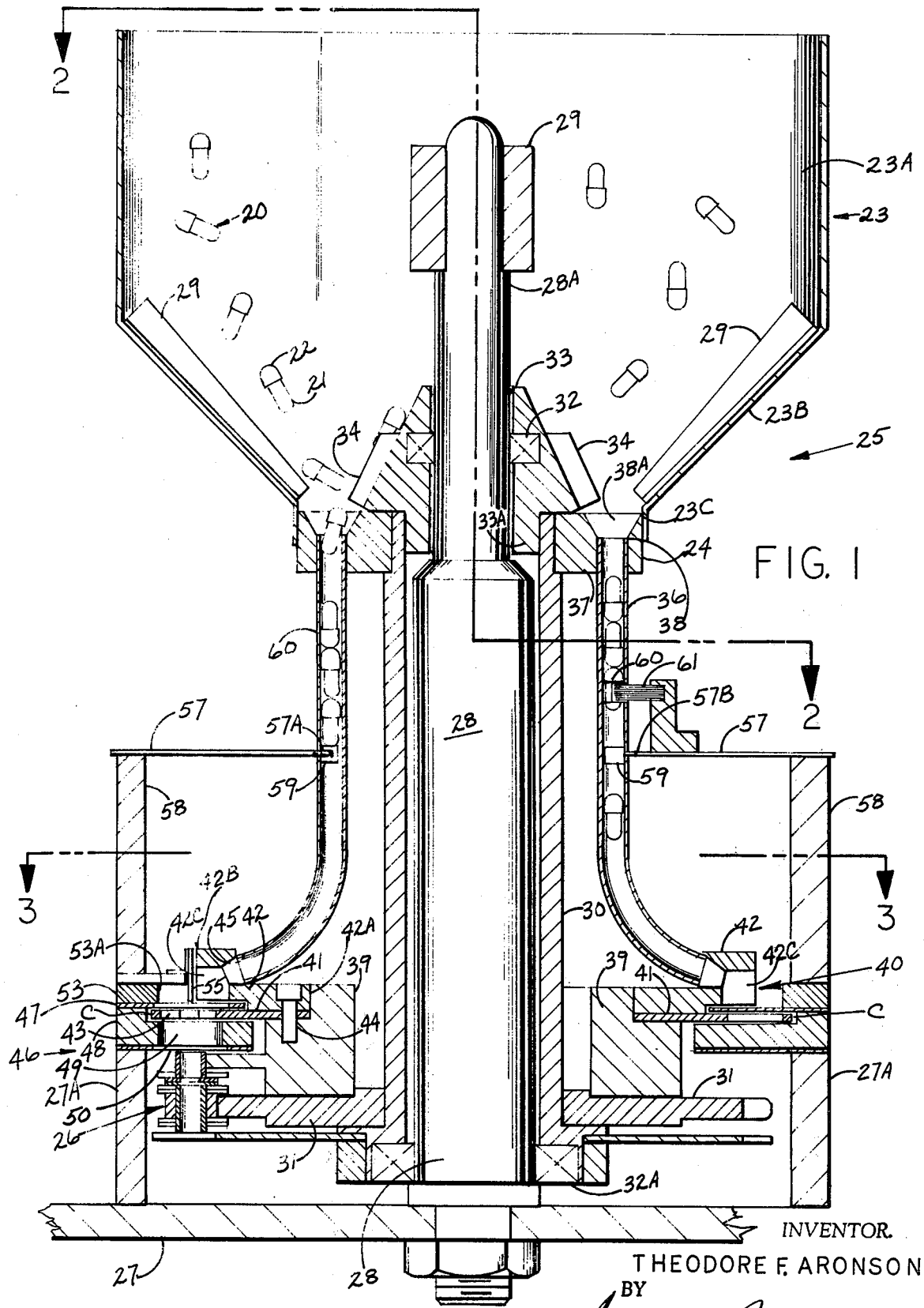
FIG. 1 is a verticle section view of a feeding and rectifying apparatus of the present invention.

Referring to the drawings there is shown in FIG. 1 a feeding and rectifying apparatus 25 adapted for positioning an article 20 onto a moving conveyor 26 adapted to receive the same. The moving conveyor 26 may be of the type disclosed in co-pending application Ser. Nos. 765,519 and 776,128 filed Oct. 7, 1968 and Nov. 15, 1968 respectively, now U.S. Pat. Nos. 3,527,015 and 3,601,954, respectivly.

The apparatus 25 comprises a means defining a supporting structure which may include a suitable table or frame 27 to which there is fixedly secured an upwardly extending shaft 28. Connected to the upper end of the shaft is a hopper 23 adapted to receive a random supply of articles 20. The upper end of the shaft 28 is provided with a reduced portion 28A adapted to receive the hub 29 of a spider by which the hopper body 23A is fixedly secured thereto. In the illustrated form of the invention the hopper body 23A includes a cylindrical portion and a connected inwardly and downwardly sloping bottom wall 23B to define an opening 23C. If desired, a plurality of vanes 29 are circumferentially spaced and suitably secured to the inclined bottom wall 23B of the hopper to prevent rotation of the mass of articles disposed within the hopper 23, as will be hereinafter described.

The lower portion of the shaft 28 is incased within a sleeve 30 which is rotatably journalled to the shaft 28 by suitable bearings 32, 32A. Connected to the lower end of the sleeve 30 is a drive means 31 by which the sleeve 30 may be rotated relative to the fixed shaft. The drive means 31 in the illustrated embodiment comprises a sprocket about which a conveyor means 26, in the form of a chain conveyor of the type disclosed in co-pending application Ser. Nos. 765,519 now U.S. Pat. No. 3,527,015, and 776,128, now U.S. Pat. No. 3,601,954, is threaded. The chain conveyor 26 is thus arranged so as to be synchronized to the rotation or movement of the sleeve 30 and the article discharging means 24 carried thereon, as will be hereinafter described. The chain conveyor as disclosed in co-pending application Ser. Nos. 765,519 and 775,128, is provided with capsule receiving portions into which the respective rectified capsules 20 are to be fed. However, it will be understood that a further detailed description of the conveyor is not essential to an understanding of the present feed and rectifying apparatus so long as it is understood that the moving conveyor 26 with the capsule receivers thereon is moving in synchronization with the feed and rectifying apparatus 25.

Fixedly connected to the upper end of the sleeve 30 to rotate therewith is a conical collar 33, which is formed with a plurality of walls or vanes 34 to define a plurality of passageways or guideways 34 for directing the capsule toward a discharge passageway or tube 36.

As shown, the lower end 33A of collar 33 is reduced so as to be received and fixed to the upper end of the sleeve 30. Each tube or passageway 36 is operatively associated with each of the respective guideways 35.

Figure 2:
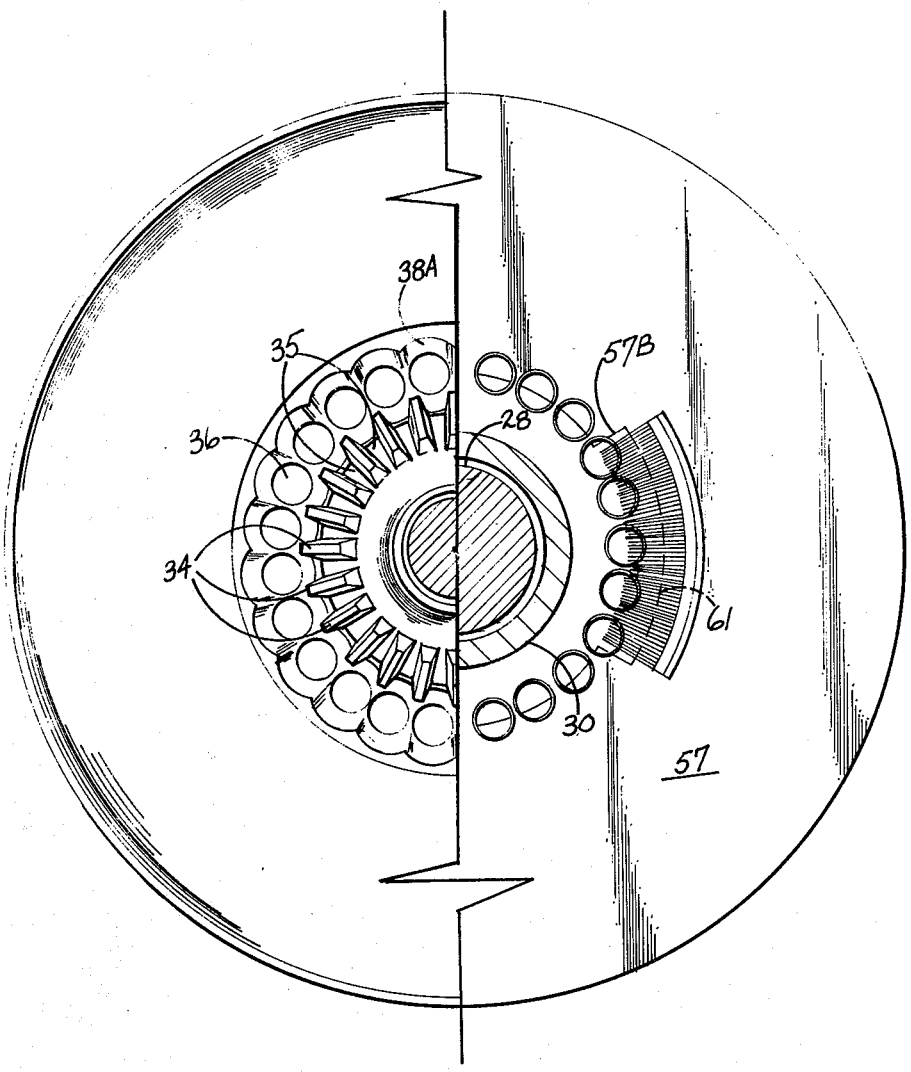
FIG. 2 is a composite plan view taken along line 2—2 on FIG. 1.

As best seen in FIGS. 1 and 2 the plurality of circumferentially spaced discharging tubes 36 are secured to a flange or collar 37 which in turn is connected to sleeve 30 to rotate therewith. The inlet portion 38A of the openings 38 adapted to receive the respective tubes 30 are outwardly flared as seen in FIG. 1 to facilitate the aligning of the article 20 cotained within the hopper with the inlet end of the respective discharge tubes 36. The diameter of the flange or collar 37 is sized as to be received within the opening 23C defined in the bottom wall 23B of the hopper. The arrangement is such that the collar or flange 37 is free to rotate relative to the body 23A of the hopper within opening 23C. The flange or collar 37 and associated discharge tubes 36 constitute a rotary discharge means of the hopper 23 through which the articles are withdrawn from the hopper in an orderly stacked array.

The lower or outlet ends of the respective discharge tubes 36 are provided with a radius for directing the articles passing therethrough in a radially outward direction. As shown in FIG. 1 the respective discharge ends of the tubes 36 are secured in a mounting 39 connected to the driving sprocket 31. Connected to the mounting 39 to rotate therewith is a component part of the orienting or rectifying means 40. Means 40 includes a gauging plate 41 and a complementary chamber plate 42. As best seen in FIG. 6A the gauging plate comprises an annular member having circumferentially spaced therearound a plurality of gauge openings 43 which are particularly shaped so as to include a gauging portion 43A and an escapement portion 43B.

In the illustrated embodiment, the gauging opening 43 is particularly shaped to handle capsules 20. Accordingly, the gauging opening 43 is sized so as to have opposed similarly constructed gauging portions 43A, 43A, with an enlarged escapement portion 43B disposed therebetween. The gauging portions 43A, 43A, are specifically sized to have a snug or slight interference with the body portion 21 of the capsule. With the gauge opening 43 sized as described, the arrangement is such that the body portion 21 of the capsule is permitted to pass therethrough before the cap portion 22 regardless of which way the capsule is positioned relative to the gauge opening 43, as the larger cap portion 22 of the capsule will not fit through 43A but will fit through 43B.

It will be noted that the gauge plate 41 is provided with gauge openings which correspond in number to the number of discharge tubes 36. As the gauging plate 41 is fixed to the mounting block 39 it will rotate with the sleeve 30, connected driving sprocket 31 and conveyor 26 meshing therewith.

Co-operatively associated with the gauge plate 41 and connected to rotate therewith is the chamber plate 42. The chamber plate comprises a flange portion 42A which is connected in overlying relationship to the gauging plate 41 by suitable fasteners or studs 44. The outer portion of the flange 42A is formed with a raised portion 42B. The raised portion 42B of the chamber plate is provided with a plurality of circumferentially spaced openings 45 for receiving the discharge end of the respective tubes 36. Adjacent each discharge end of the respective tubes 37, the chamber plate 42 is formed with a cell or chamber 42C for receiving a capsule 20 from the associated discharge tube 36. In the arrangement thus far described the sprocket 31, shaft sleeve 30 and the connected discharge tubes 36, gauge plate 41 and chamber plate 43 all rotate in unison relative to the fixed shaft 28 and connected hopper 23 when the sprocket 31 is actuated or driven.

The complementary portion of the orienting means comprises a stationary camming means 46. The complementary camming means 46 includes a pair of spaced cam plates 47 and 48 which are suitably fixed to the supporting frame 27 by spaced support members 27A to define therebetween an annular chamber C. As seen in FIG. 1 and FIGS. 4 to 12, the camming means includes an upper cam plate 47 and lower cam plate 48, the lower cam plate 48 having a recessed portion 48A underlying the gauge openings 43 of the gauge plate 41. As best seen in FIG. 5 the recessed portion 48A is provided with a cam opening 49. Referring to FIG. 5 the cam opening is provided with an enlarged end opening 49A wherein the width of the opening is slightly greater than the longitudinal axis of the gauge opening 43. The enlarged portion 49A tapers to an elongated reduced opening 49B. Referring to FIG. 3 it will be noted that enlarged portion 49A extends from approximately position 4 to position 5. From position 5 in the direction of position 7 the opening 49A tapers to a dimension which is equal to or slightly greater than the diameter of the escapement portion 43B of the gauging opening 43. In the vicinity indicated between the dotted lines on FIG. 5 and as best seen in FIG. 5A the lower camming plate is reduced to a narrow thickness to define a knife like edge 49C which will function to purge the orientation means of any defected capsules which may tend to hang up as will be hereinafter described.

Connected to the bottom of the lower cam is a floor plate 50. Referring to FIG. 3 the floor plate is formed with a slotted opening 51 which extends through substantially a quadrant portion thereof, i.e., commencing at about position 7 and terminating just beyond position 8. In the illustrated form the width of the opening 51 in the floor is substantially uniform throughout the length thereof and greater in width than the portion 49B of the opening 49 in the lower cam plate 48. As seen in FIG. 3 it will be noted that the opening 51 in the floor plate commences in the direction of rotation just before the position 7.

The upper cam plate 47 is suitably secured and fixedly connected to the raised portion 48B of the lower cam plate 48 so that a portion of the upper cam plate 47 overlies the recessed portion 48B of the lower cam 48. The overlying portion of the upper cam plate 47, as best seen in FIGS. 3 and 4, is provided with a cam opening 52 which extends about a circumscribing portion thereof. Referring to FIGS. 3, 4, and 6B, the cam opening 52 is provided with an enlarged portion 52A which tapers to a reduced elongated slotted opening 52B. The enlarged portion of the camming opening 52A extends through a circumscribing portion of the cam plate between positions 3 and 5 whereupon the opening 52A tapers to an elongated slot 52B substantially co-extensive with the reduced opening 49B of the lower cam plate 48.

In the superimposed assembled position of the upper and lower camming plate 47 and 48 on the frame 27A, it will be noted that the enlarged portion 52 of the upper cam eminates before the complementary enlarged opening portion 49A of the lower cam 48 in the direction of rotation, and that the respective reduced portions 52B and 49B respectively fall in supperimposed overlying relationship with respect to one another, and in alignment with the escapement portion 43B of the gauge opening 43 in the gauge plate 41, disposed therebetween in relative rotating relationship with respect thereto.

Secured and fixed to the upper camming plate is a locating ring 53. As shown in FIG. 3 the locating ring 53 is provided with an inner peripheral surface or wall 53A disposed in substantial coincidence with the outer most edge of the gauge openings 43. See FIGS. 7 to 11. As will be hereinafter described the wall 53A of the locating ring 53 functions to position the capsule 20 relative to its corresponding gauging opening 43 immediately prior to rectification of the capsule.

In the vicinity of positions 4 and 5, as seen in FIGS. 3 and 10 there is connected to the top of the upper cam 47 a bracket plate 54 for supporting a stationary center cam or guide 55. As shown in FIGS. 1 and 3 the centering cam or guide 55 is arcuate in shape and vertically disposed in substantial coincidence with the central portion of the article or capsule 20.

As will be hereinafter described the centering cam or guide 55 functions as a positive means directing the body of the capsule through the gauging portion 43A of the gauge opening 43 during the rectifying movement of the capsule. Where there is a snug interfit between the capsule body 21 and the gauging portion 43A of the gauge opening 43, the centering cam will effect a positive pressure on the body of the cam in directing it through the appropriate gauge opening 43A as the capsule rotates thereunder. The relative position of the edge or camming portion of the center cam 55 is such that it will direct the body portion of the capsule 20, depending on the lay thereof through the appropriate gauging position 43A of the gauge opening 43. This is because the cap portion 22 of the capsule is larger than the body portion 21 and will therefore not fit through gauge opening 43, and will remain above gauge plate 41 as shown in FIGS. 9, 10 and 10A.

Referring to FIG. 1, the discharge tubes 36 are made sufficiently long so that the upper portion thereof will serve as a magazine for retaining therein a plurality of capsules stacked end to end therein. In this manner each of the tubes 36 is arranged to store therein a plurality of capsules to insure positive feeding of the capsules to the respective cells or chambers. A means is provided for retaining the columns of stacked capsules within each of the respective tubes. The capsule retaining means comprises a stop plate or ring 57 which is supported on a bracket or support 58 fixed on the frame 27. The arrangement of the stop ring is such that the inner peripheral portion 57A of the stop ring is adapted to extend through a notch or opening 59 formed in each of the discharge tubes 36 as best seen in FIG. 1. Accordingly, the portion 57A of the ring 57 which extends into the tubes 36 provides a stop or support for the lowermost capsule 20 in the magazine portion of the respective tubes.

Referring to FIG. 2, the ring 57 is provided with a notched out portion 57B which is sufficiently wide so as to encompass one or more tubes at a position in advance of position 1 and beyond position 8 in the cycle of revolution of the gauging means. Accordingly, it will be noted that the tubes when rotating in a clockwise direction as viewed in FIG. 2 will sequentially be caused to rotate through the notched portion 57B of the stop ring. When this occurs the bottom-most capsule in the tube passing the notch 57B is no longer supported within the tubes, thereby causing the bottom-most capsule to be directed by gravity to the discharge end of the respective tubes.

To retain the next succeeding capsule from dropping, a means is provided for frictionally retaining the next to the bottom capsule. As seen in FIGS. 1 and 2 the holding means comprises a brush 61, the bristles of which are arranged to extend into a second opening 60 in tubes 36 which is spaced above opening 50. In this manner the bristles of brush 61 function to retain the next to last capsule in position within the respective tubes passing the notched portion 57B, as the bottom-most capsule is released. Upon traversing the notched portion 57B the inner peripheral portion 57A again functions to support the column of capsules in the respective tubes. Accordingly the length of the brush 61 corresponds substantially to that of the notch 57B in ring 57. In operation then the lower most capsules in each of the tubes is released as the tubes rotate past the notched portion 57B of the step ring with the remaining portion of the column being supported by the friction of the brush acting on the next to the bottom capsule. Thus the brush means 61 provides the necessary holding force without causing injury to the capsule during the release interval of the bottom-most capsule. The arrangement described thus provides for a positive release of the bottom-most capsule and a retention of the remaining portion of the column of capsules within the respective tubes at the point of release. Accordingly, it will be noted that with the arrangement described the capsules are individually released at a predetermined point, whereupon the released capsule is directed to the cell portion 42C of the rotating chamber plate 42.

Figure 2A:
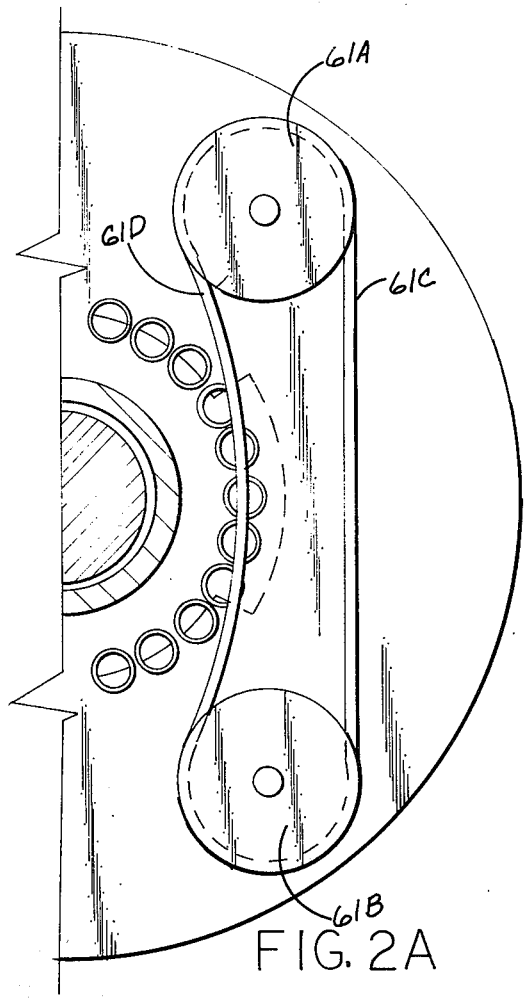
FIG. 2A is a modified form of the invention.

Referring to FIG. 2A, there is shown an alternate means for retaining the next to last capsule in the discharge tubes from dropping upon the release of the bottom most capsule. The alternate means includes a pair of free running idler pulleys, 61A, B, each being oppositely journalled the ends of notch 57B of stop plate 57. Threaded about the idling pulleys is an endless band or belt 61C having a flight portion 61D thereof passing through openings 60 formed in the respective discharge tubes 36. As shown the pulleys 61A, 61B are positioned so that flight 61D of belt 61C is urged against the next to the last capsule in tube 36 to retain the capsule by friction in position therein as the respective tube 36 approaches the release notch area of stop plate 57. Thus it will be apparent that the brush 61 of FIG. 2 and the endless belt arrangement 61A—61D of FIG. 2A function to prohibit the column of capsules from dropping through the respective tubes 36 as the tubes approaches and passes through the notched area 57B of the stop plate 57.

Referring to FIG. 3, the cycle of operation is as follows: With the sleeve rotating and the discharge tubes connected thereto rotating in unison therewith, in a clockwise direction as viewed in FIG. 2, the capsule directing means in the form of the one collar 33 will continuously direct the capsules into the inlet portions of the tubes, the vanes 29 functioning to prohibit rotation of the mass of capsules within the hopper 23. The magazine portion of the tubes 36 is thus maintained substantially constantly filled with a column of articles so long as the hopper is maintained sufficiently full. As the tubes 36 successively rotate past the notch 57B of the stop plate 57, the bottom-most capsule is released whereby it is directed to a capsule chamber 42C formed in the rotary chamber plate 42 rotating with the tubes 36. The cycle of operation is such that the capsule is released into its corresponding cell or chamber 42C, at approximately position 1 indicated in FIGS. 3 and 7. Due to the centrifugal force of the rotating cell plate, the capsule 20 is displaced radially outwardly until one end thereof engages the locating edge 53A of the locating ring 53 as seen in FIG. 8. This occurs at approximately position 2 in the rotational cycle as viewed in FIG. 3. During this portion of the cycle the capsule is riding and carried within its cell or chamber 42C on the solid portion 47A of the upper cam plate 47. Rotating in unison with the capsule and immediately below the upper cam plate is the gauging plate 41, the respective gauge openigs 43 therein being located directly below the capsule. Accordingly, as both the capsule and the gauge plate 41 pass the solid portion of the cam plate 47, the capsule will fall through the enlarged portion of the opening 52 and onto the gauge opening 43. Regardless of which end of the capsule is presented to the wall 53A of the locating ring 53 the smaller body portion of the capsule will tend to drop either by gravity or by the camming action of vertical inclined cam 55 through the corresponding gauging portions 43A of the gauge opening 43. The other end or cap portion because of its larger dimension is prohibited from dropping through the gauging portion 43A of gauging slot 43 thereby causing the capsule to rotate from a substantially horizontal position to a generally vertical position. As viewed in FIGS. 3 and 9 the capsule is rotated beyond the solid portion 47A of the upper cam and through opening 52 therein at approximately position 3. As the capsule continues to rotate in a clockwise direction as viewed in FIG. 3 from position 3 and in the vicinity between position 4 and 5, the body portion, regardless of which end it points, is brought under the centering cam whereby the capsule is positively directed through the gauging portion 43A of the slotted opening 43 in the event a snug or interference fit is had between the capsule body and portion 43A of the slot. As seen in FIG. 3 and in FIGS. 9 and 11, the opposed ends of the capsules are brought into engagement with the corresponding edges of the cam openings 53 and 49 of the respective upper and lower cam plates 47 and 48 as the body end of the capsule is caused to pass through its gauge slot 43. Due to the confining curvatures of the camming edge of cam slots 52 and 49 the capsule as it is rotated to a vertical position is advanced toward the escapement portion 43B of the gauge slot. When the capsule has reached approximately position 6, as viewed in FIGS. 3 and 11, the capsule has been substantially rectified and about to be released through the escapement portion 43B of the gauge opening 43. Release of the capsule is finally effected at about position 7, as viewed in FIGS. 3 and 12. Since the moving conveyor is moving in unison with the cycle described the capsule upon its release is received in a capsule carrier mounted or formed on the conveyor 26. As seen in FIG. 11, the article is dropped by gravity and pulley by vacuum 62 into the receiver adapted to receive the same.

In the event of a deformed capsule which may hang up in the escapement portion 43B of the gauge opening or for some reason not release between position 7 through position 8 as viewed in FIG. 3, the capsule will be carried beyond position 8. In order to purge the rotating gauge plate 41 of any such defected or hung up capsules, the lower cam member 48 and upper cam member 47 are provided with a reduced thickness in the vicinity of the end of the reduced opening 49B and 52B to provide a shear or cutting edge. Thus as the defected capsule is caused to be rotated thereby, the shearing action effected between the rotating plate 41 and the stationary lower and upper cam plates will destroy the capsule thereby rendering the orienting means 46 self cleaning. To provide a positive release of the capsule 20 from the rectifying means described, a vacuum or low pressure chamber 62 is disposed below the conveyor means as described in said co-pending application Ser. Nos. 765,519, now U.S. Pat. No. 3,527,015, and 776,128, now U.S. Pat. No. 3,601,954, to positively draw the capsule into its receiver. With the capsule in its receiver the conveyor transports the respective capsules to the next series operation station wherein the caps of the respective capsules are removed and the body filled in a manner described in the foregoing mentioned co-pending applications.

The foregoing method and apparatus thus provides for positive rectification of the capsule by effecting relative rotation between cooperating camming and gauging members. While the method and apparatus has been described with reference to a capsule, it will be understood that variously shaped articles can be rectified by the method and apparatus so long as the gauging openings 43 are properly proportioned to the shape of the article.

For examples, FIG. 14 illustrates another form of article which may be rectified by the foregoing method and apparatus. The article illustrated in FIG. 14 may comprise an elongated object 65 having dissimilar shaped end portions, as for example, the head end of a bullet. Accordingly, a gauging opening 66 of the type illustrated in FIG. 14A is required to be formed in the gauging plate 41. In all other respects the operation and structure is unchanged. In FIGS. 14 and 14A the opposed gauge portions K of the gauging slot 66 are required to be made larger than the dimension C but less than the dimension A of the article 65 and that the width W of the gauging slot is made slightly less than the diameter of the object. Disposed between the opposed gauging portion K is an enlarged escapement portion 67. With the gauge slot 66 as constructed, it will be understood that regardless of which end of the object is presented to the corresponding opposed gauging portion K, the shorter A dimension of the article will always pass through the corresponding gauging portion K, before the D portion of the object. Objects so shaped will be therefore rectified in a manner hereinbefore described.

The method and apparatus may also be utilized to rectify such objects, as for example, as sheel casing 69, as illustrated in FIG. 15. With such an object a gauging slot 70 of the type illustrated in FIG. 15A must be provided in the gauge plate 41. In this embodiment it will be noted that regardless of the manner in which the shell case is presented to the slot 70, the smaller or more narrow end of the shell casing will pass through the corresponding gauge portion 70A of slot 70 before the larger end, and the co-action of the cooperating cams acting on the shell casing will advance it toward the escapement portion 70B of the slot 70. With the construction described, rectification of objects can be attained for shapes not heretofore contemplated by prior know machines.

FIGS. 16 and 16A illustrate another variously shaped object and corresponding gauging opening necessary to be formed in the gauging plate 41 to effect rectification thereof. In this form it will be noted that the longer narrow portion 80A of the object 80 will pass through the gauging portion 81A of slot 81 before the head end 80B of the object can pass therethrough.

In each of the foregoing noted shapes and others, it will be observed that the corresponding gauge opening or slot to be formed in the gauging plate has opposed gauging portions adapted to gauge or snuggly receive the smaller end portion of the object whereby the opposed larger end of the object is prohibited from passing therethrough. Thus escape of the article from the gauge opening can be effected only when the article has been rectified and moved to a position wherein the enlarged portion of the article is brought into alignment with the escapement portion of the respective gauging openings. The displacement of the rectifying object toward the escapement portion of the gauge opening is effected by the co-action of the camming openings formed in the upper and lower cam plates 47 and 48 as the gauging plate 41 and the articles carried thereby are rotated relative to the fixed cam plates.

From the foregoing it will be noted that simply by interchanging gauge plates with variously shaped gauge openings that the method and apparatus described can be readily adapted to accommodate rectification of variously shaped objects in a simple, positive and expedient manner.

While the invention has been described with respect to various embodiments thereof it will be understood that variations and modifications may be made without departing from the spirit or scope of the invention.

What is claimed is:

1. A feeder for successively feeding an article of manufacture to a moving carrier comprising:
   hopper means adapted to receive a supply of said articles,
   means cooperatively associated with said hopper means defining a discharge through which articles are successively dispensed from said hopper means,
   means for effecting relative rotation between hopper means and said discharge means,
   and means for orienting said articles as they are successively dispensed from said discharge means so that said articles are similarly presented to the moving carrier,
   said orienting means comprising
   means defining a chamber, and
   a gaging means having a gaging slot disposed within said chamber, said chamber and gaging means being mounted for rotation whereby said article is directed through said slot to the carrier,
   and including means for purging said orienting means of any defective article.

2. A method of feeding and rectifying article of manufacture to orientate said articles in a predetermined manner comprising the steps of:
   maintaining a supply of said articles at random in a hopper,
   sequentially removing said articles from said hopper at random so that the axis of successively removed articles are coincident,
   imparting said articles to a centrifugal force in which the axis of said article is disposed in the plane of said centrifugal force, causing said articles to be rotated so that the axis of said article is disposed perpendicular to the plane of said centrifugal force,
and guiding said articles as the axis thereof is being rotated to a point of release from the influence of said centrifugal force,
and including the step of subjecting said article to a negative pressure to release it from the influence of said centrifugal force.

* * * * *

UNITED STATES PATENT AND TRADEMARK OFFICE
CERTIFICATE OF CORRECTION

PATENT NO. : 3,942,645
DATED : March 9, 1976
INVENTOR(S) : Theodore F. Aronson

It is certified that error appears in the above-identified patent and that said Letters Patent are hereby corrected as shown below:

Column 1, line 28, "and" should read --the--.

Column 2, line 9, "is turn in" should read --in turn is--.

Column 2, line 51, "verticle" should read --vertical--.

Column 4, line 9, "cup" should read --cap--.

Column 4, line 37, "may effected" should read --may be effected--.

Column 5, line 55, "775,128" should read --776,128--.

Column 5, line 63 "feed" should read --feeding--.

Column 6, line 11, "cotained" should read --contained--.

Column 6, line 55, "sleeve 30" should read --shaft 28--.

Column 8, line 44, "therein" should be deleted.

Column 9, line 11, "50" should read --59--.

Column 9, line 55, "tubes" should read --tube--.

Column 9, line 61, "one" should read --cone--.

Column 11, line 68, "know" should read --known--.

Signed and Sealed this

Fourth Day of January 1977

[SEAL]

Attest:

RUTH C. MASON
Attesting Officer

C. MARSHALL DANN
Commissioner of Patents and Trademarks